United States Patent [19]

Milliken

[11] 4,186,825
[45] Feb. 5, 1980

[54] BRAKE ADJUSTER HAVING RESHAPABLE MEMBER DRAWN THROUGH A DIE

[75] Inventor: Paul E. Milliken, Massillon, Ohio

[73] Assignee: Goodyear Aerospace Corporation, Akron, Ohio

[21] Appl. No.: 933,350

[22] Filed: Aug. 14, 1978

[51] Int. Cl.² .............................................. F16D 65/54
[52] U.S. Cl. ................................. 188/196 R; 72/367; 72/467; 188/71.8; 192/111 A
[58] Field of Search ............. 188/196 P, 196 R, 71.8, 188/1 C; 192/111 A; 72/467, 367

[56] References Cited

U.S. PATENT DOCUMENTS

| | | | |
|---|---|---|---|
| 1,924,734 | 8/1933 | Brown | 72/467 |
| 2,846,056 | 8/1958 | Hampton | 72/467 |
| 3,095,064 | 6/1963 | Tankersley et al. | 188/196 P X |
| 3,696,891 | 10/1972 | Poe | 188/1 C |
| 3,714,859 | 2/1973 | Tupper | 188/1 C X |

FOREIGN PATENT DOCUMENTS 807804  7/1951  Fed. Rep. of Germany ............ 72/467
811505  4/1959  United Kingdom ................ 188/196 R

*Primary Examiner*—George E. A. Halvosa
*Attorney, Agent, or Firm*—P. E. Milliken; R. L. Weber; E. W. Oldham

[57] ABSTRACT

A brake adjuster providing compensation for brake wear. Fundamentally, the invention includes a casing attached to a brake housing and maintaining a spring follower therewithin. A shaft or pin is connected to the pressure plate of a brake assembly and is interconnected with a reshapable tube. The shaft and tube pass through a die which makes swaging engagement with the tube. As the brakes wear, the tube is drawn through the die and is progressively swaged along the length thereof. The spring follower acts against the die to urge the die, tube, and shaft to a return position following release of brake pressure. Such action releases the pressure plate from forceful engagement with the brake disk stack. In an alternative embodiment, the shaft can be eliminated and one end of the reshapable tube can be connected directly to the pressure plate or to a suitable connection member on the pressure plate.

14 Claims, 12 Drawing Figures

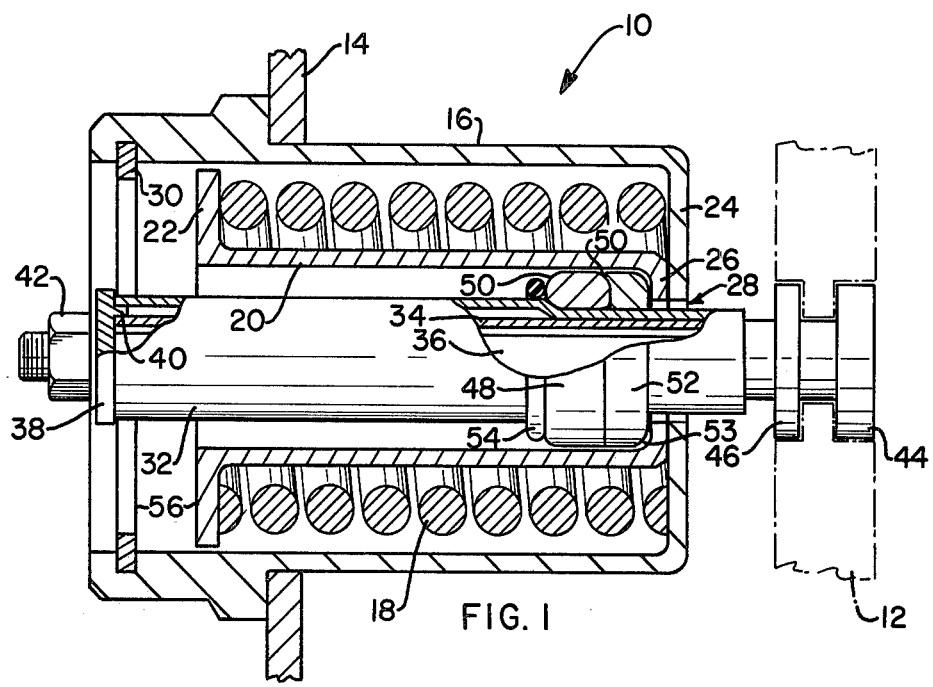
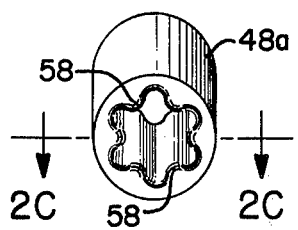
FIG. 2A
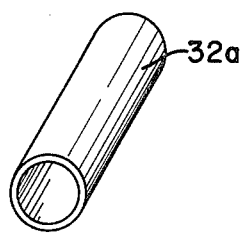
FIG. 2B
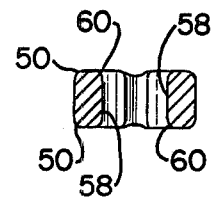
FIG. 2C
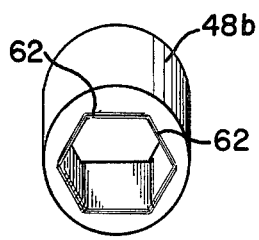
FIG. 3A
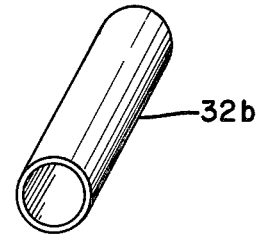
FIG. 3B 4,186,825

BRAKE ADJUSTER HAVING RESHAPABLE MEMBER DRAWN THROUGH A DIE

BACKGROUND OF THE INVENTION

The invention presented herein lies in the art of brake adjusters, compensating for brake wear, and more particularly for such adjusters used in association with aircraft braking systems. For many years, it has been known to utilize a number of brake disks, alternately splined to the hubs and axles of aircraft wheels, and to force the same into frictional engagement with each other to achieve a braking action. Of course, such disks have a tendency to wear with use and, hence, it is necessary that adjustments be made such that the relationship between brake pedal travel and brake force are unaffected by the wear experienced by the brake disk stack. Further, such adjustment is desirable in order that the life and usage of such brake disks may be maximized.

Various approaches have been taken in the past to provide for brake adjustment. Standard types of adjusters have been utilized wherein brake adjustment is achieved by a frictionally slidable unit maintained upon a tube. Such standard brake adjuster mechanisms have been characterized by wide variance of loads existing for any given distance of brake travel or brake application. That is, the force versus displacement curves of the present standard types of adjusters do not trace each other on successive brake applications and as the brake disks wear. Indeed, the force necessary to overcome the frictional engagement between the slidable unit and the tube varies with each brake application.

Further, the standard brake adjusters of the prior art require that design considerations be given to the difference existing between the static and dynamic coefficients of friction associated with such adjusters. As is known in the art, when brake pressure is initially applied, the first distance of travel experienced by the return mechanism is that known in the art as the built-in clearance. The following portion of travel is that required to compensate for brake wear experienced during prior braking efforts. Of course, this amount of travel is very minute when compared, for instance, to the travel taking up the built-in clearance. Above this, the force applied is that known as the effective brake force. However, the static coefficient of friction between the slidable unit and the tube is greater than the dynamic coefficient of friction therebetween and the force applied to effectuate movement of the standard adjusters to compensate for brake wear must therefore be sufficient to overcome both coefficients of friction and the return spring brake on force. Should the standard unit slip, the spring follower may then return to a point where there is no longer a built-in clearance. In other words, if there is a significant difference between the static and dynamic coefficients of friction, and if the spring of the spring follower mechanism is of sufficient strength, upon brake application the spring follower may be urged to a point where there will no longer be a built-in clearance. The brakes will then either stay in a locked position, or at best, there will be a significant loss of built-in clearance for subsequent brake applications.

A number of approaches have been taken to resolve the problems inherent with the present standard types of adjusters. Teachings of such approaches are found in U.S. Pat. Nos. 2,888,109, and 3,542,165. These teachings are of general interest with respect to the invention presented herein, but are not seen as particularly pertinent in that such teachings themselves have certain inherent drawbacks. It will become apparent hereinafter than the instant invention provides significant advantages over the prior art teachings.

OBJECTS OF THE INVENTION

In light of the foregoing, it is an object of the instant invention to present a brake adjuster which is predictable and repeatable in operation with respect to consecutive brake applications.

Another object of the invention is to present a brake adjuster wherein the force differential between static and dynamic friction between the parts thereof is minimized or eliminated.

Still a further object of the invention is to present a brake adjuster wherein a reshapable member is drawn through a die such that there is minimized brake adjuster force dissipated in the reshaping process, and wherein the frictional force existing between the parts is a small percentage of the total load applied to the brake adjuster.

Yet another object of the invention is to present a brake adjuster which is simplistic in design, reliable and repeatable in operation, easily adapted to utilization with existing brake systems, and relatively inexpensive to construct.

SUMMARY OF THE INVENTION

The foregoing and other objects of the invention which will become apparent as the detailed description proceeds are achieved by the improvement of a brake adjuster in a braking system including a brake housing and a pressure plate, comprising: a support member maintained in fixed relationship to the brake housing; reciprocating means associated with said support member for reciprocating movement between first and second ends thereof; a die carried by said reciprocating means and movable therewith; a tubular member passing through said die and being operatively connected at one end thereof to the pressure plate and movable therewith; said die being in reshaping contacting engagement with the tubular member.

DESCRIPTION OF DRAWINGS

For a complete understanding of the objects, techniques, and structure of the invention, reference should be had to the following detailed description and accompanying drawings wherein:

FIG. 1 is a sectional view of the brake adjuster of the invention showing the same interconnected between a pressure plate and a brake housing;

FIGS. 2A-2C show a perspective view of a die, a perspective view of a reshapable tubular member, and a sectional view of the die of FIG. 2A taken along the line 2C—2C, respectively;

FIGS. 3A and 3B are respectively perspective views of a die and reshapable tube as the same could be utilized in accordance with the teachings of the invention;

DETAILED DESCRIPTION OF PREFERRED EMBODIMENTS

Figure 4A:
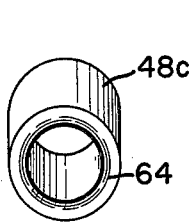
FIGS. 4A-4D respectively present perspective views of a round die and three associated hexagonal reshapable members, as the same would be utilized in accordance with the teachings of the invention.

Referring now to the drawings and more particularly FIG. 1, it can be seen that the brake adjuster assembly of the invention is designated generally by the numeral 10. The assembly 10 is operatively interconnected between a pressure plate 12 and a brake housing 14. The pressure plate 12 is, in standard fashion, associated with a brake disk stack to cause forceful engagement between the disks to achieve the desired braking action. These disks are alternately splined to the wheel and axle of an aircraft such that forceful engagement therebetween provides frictional retarding of the braked wheel to achieve the stopping effort.

The assembly 10 fundamentally includes a casing 16 which is affixed to the brake housing 14. Maintained within the casing 16 is a spring 18 which operates against a spring follower 20, the spring 18 being maintained between a flange 22 of the spring follower 20 and an end portion 24 of the casing 16. The spring 18 normally urges the spring follower 20 toward the keeper or retainer 30 which makes contacting engagement with the flange 22. When brakes are applied, the pressure plate 12 draws the spring follower 20 away from the retainer 30 until the shoulder 26 comes into contacting engagement with the end portion 24.

Both the spring follower 20 and the end portion 24 of the casing 16 are characterized by corresponding openings as at 28. A tube 32 of reshapable or swageable material is maintained within the spring follower 20 and, in operation, passes through the openings 28. Maintained within the tube 32 is a sleeve 34 which, in turn, passes over a threaded pin or shaft 36. It will become apparent hereinafter that the sleeve 34 is not particularly necessary in the operation of the invention, but is included in the embodiment disclosed in FIG. 1 to facilitate retrofitting to existing systems utilizing a particular size of threaded pin or shaft 36. In this embodiment, a washer 38 is provided at one end of the assembly 32–36, being placed over the end of the shaft 36. The washer 38 is characterized by a raised rib or protrusion 40 which circumferentially separates the tube 32 from the sleeve 34, as shown. A self-locking nut 42 is fixedly secured to the end of the threaded pin 36 to secure the elements 32–36.

The threaded pin 36 is characterized by an enlarged head 44, which is received within a counter-bore in the pressure plate 12, as shown. A keeper 46 is provided about the sleeve 34 to complete the secured engagement of the pressure plate 12 to the return assembly 10. It should now be noted that the self-locking nut 42 secures the sleeve 34 and pin 36 at one end thereof while those elements are secured at the other end by means of the keeper 46 and head 44.

Maintained within the spring follower 20, and receiving the tube 32, is a die 48. As can be seen, the die 48 has rounded edges 50 for mating with the washer 52 which is spherically or otherwise cupped to receive the die 48. The particular structure of the die 48 and washer 52, just described, guarantees that the assembly 32–36 and the die 48 will always maintain an in-line posture. With jitter or the like being experienced between the pressure plate 12 and the brake housing 14, the assembly 32–36 might shift and, without the rounded edges 50 of the die 48 mating with the spherical recess of the washer 52, the die 48 might be caused to dig into one side of the tube 32 while disengaging from the opposite side, thus defeating the operational effectiveness of the assembly 10. Of course, the rounded edges 53 of the washer 52 allow that washer a degree of movement within the spring follower 20.

Provided about the tube 32 and in contacting engagement with the die 48 is an O-ring 54 or other suitable sealing means enclosing the die opening and keeping the same from receiving dirt or the like. As will become apparent hereinafter with discussion of the operation of the invention, the die 48 swages and reshapes the tube 32, as shown in FIG. 1, as the tube is drawn through the die. Should dirt or other foreign material become engaged between the die and the tube, the load characteristics of the assembly 10 will change, defeating the object of having uniformity and repeatability in the brake adjuster operation.

Prior to brake application, the shoulder 22 of the spring follower 20 rests against the keeper 30, as previously mentioned. When the brakes are applied, the pressure plate 12 moves to force the disks of the brake disk stack into frictional engagement with each other. This motion causes the spring follower 20 to move against the bias of the spring 18 to the point where the shoulder 26 abuts the end portion 24 of the casing 16. At this point in time, further movement of the pressure plate 12, compensating for brake wear, can only be made by drawing the tube 32 through the die 48. With the die 48 being generally of lesser diameter than that of the tube 32, reshaping or swaging of the tube 32 occurs as the pressure plate moves forward. Since the inside diameter of the die 48 is smaller than the outside diameter of the tube 32, the tube is wedged into the die in a force-fit, thereby temporarily locking the tube and die together in a relative axial position with respect to each other. When the brakes are released, since the die 48 and tube 32 are temporarily locked together, the spring follower 20 forces the washer 52, die 48, and the engaged tube 32 back a distance equivalent to the built-in clearance 56, awaiting further braking action. However, the tube 32 now protrudes through the opening 28 an additional distance equivalent to the length of the portion of the tube 32 which has been reshaped by the die 48, thereby compensating for brake wear and maintaining a fixed built-in clearance. On subsequent brake applications, the procedure is repeated with the tube again being drawn some further distance through the die 48 to compensate for brake wear.

The die 48 may be of the nature designated as 48a in FIG. 2A. In this embodiment, the die is a fluted one, having swaging edges 58 thereabout. In the embodiment of the die 48a, there are six such swaging surfaces which will engage the reshapable tube 32a, the tube 32a having an outside diameter slightly greater than that of the circle defined by the swaging edges 58 of the die 48a. Further, as shown in FIG. 2C, the swaging surfaces 58 of the die 48a are rounded on both sides, as at 60, for purposes of receiving the tube 32a without broaching or cutting the same. Consequently, an external swaging of the reshapable tube 32a is achieved.

In FIG. 3A, yet another die, 48b, is shown for operation with a reshapable tube 32b. In this embodiment, the die is hexagonally shaped having swaging surfaces 62, again rounded at the edges, for making swaging engagement with the tube 32b. Again, the lateral center portion of the swaging surfaces 62 lies within a circle of a diameter slightly less than that of the tube 32b.

Figure 4B:
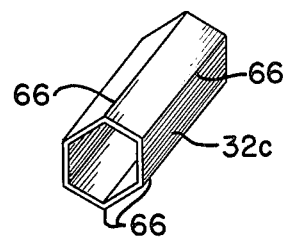

In FIGS. 4A–4B, a slightly different arrangement of the die and tube is shown wherein a die 48c, having a round die surface 64, is incorporated with an hexagonally shaped tube 32c. Swageable surfaces 66 are provided along the tube 32c and lie within or define a circle of diameter slightly greater than that of the internal diameter of the die 48c. Again, with the tube 32c being drawn through the die 48c, a swaging action takes place between the inner surface of the die 48c and the surfaces 66.

Figure 4C:
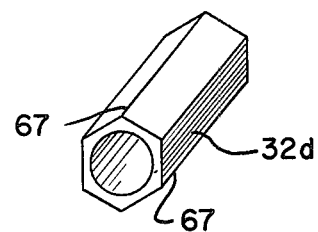
Figure 4D:
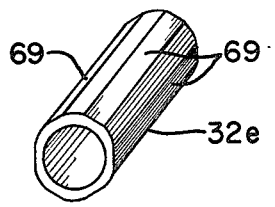

With reference to FIGS. 4C–4D, it can be seen that reshapable tubes 32d and 32e may be used in association with the die 48c to achieve the desired swaging action. The tube 32d is externally similar to the tube 32c, but has a different internal geometry, being circular rather than hexagonal in cross-section. The tube 32d, being more rigid than the tube 32c due to a greater wall thickness, will resist internal deformation more than the tube 32c such that a true swaging action may be experienced between the inner surface of the die 48c and the swageable surfaces 67. Similarly, engagement between the die 48c and the arcuate swageable surfaces 69 of the tube 32e will result in a swaging of the external surfaces of contact without force being dissipated by internally deforming the tube.

It will be noted that in each of the embodiments of FIGS. 2A–4D, there are plural locations or areas of contact between the die 48 and the reshapable tube 32. Areas of clearance exist between these contact areas, such clearance providing a place for the material of the tube 32 to flow while the swaging action occurs at the plural areas of contact. As the die 48 moves axially along the reshapable tube 32, the swaged material is thus allowed to flow circumferentially, rather than axially, with respect to the tube. Hence, the swaged material does not build up or accumulate in the axial path followed by the die 48 along the tube 32, such an accumulation being undesirable in that it would tend to alter the load characteristics between the tube and die.

It will be noted that the dies 48a–48c are provided with rounded edges on their respective swaging surfaces on both sides of the die. Further, all of the dies are provided with rounded edges 50, as best shown in FIG. 1, such that the dies are symmetrical and may be placed into the assembly 10 and about the associated reshapable tube 32 in either direction, thus preventing the possibility of improper assembly.

It will be appreciated that in operation, an amount of the load applied to the pressure plate 12 must serve to overcome the built-in clearance against the bias of the spring 18, and an additional portion of the load must serve to draw the tube 32 through the die 48 to compensate for brake wear. It is preferable that this brake wear compensation portion of the load be small with respect to the effective brake force and that the same be predictable. With the swaging technique of the assembly 10, friction is at a minimum, and consequently, the unpredictability or disparity between the static and dynamic coefficients of friction do not bear upon design considerations. However, consideration should be given to the following parameters:

(1) The nominal wall thickness of the tube 32

The thicker the wall, the heavier the load must be to reshape the same. It has been found that the load attributed to reshaping the tube varies in proportion to the square of wall thickness.

(2) The interference between tube and die

There has been found to be a direct linear relationship between load and the differences of diameter between the tube and the swaging surfaces of the die.

(3) The width of the contact area

The load varies as a function of the area of the swaging surface of the die in contact with the tube.

(4) The shape of the contact surface

The load is reduced if the swaging surface is rounded as compared to a sharp surface.

(5) The hardness of the surface of the tube

The basic characteristic hardness of the tube bears upon the amount of load necessary to reshape the same and, hence, consideration must be given to whether or not the tube should be burnished or the like.

(6) The concentricity of the tube

It is important that the reshapable tube be centered with respect to the die such that equal reshaping be imparted to all contacted surfaces of the tube.

(7) The surface finish

Whether the tube is polished or rough affects the load required to reshape the tube.

Figure 5:
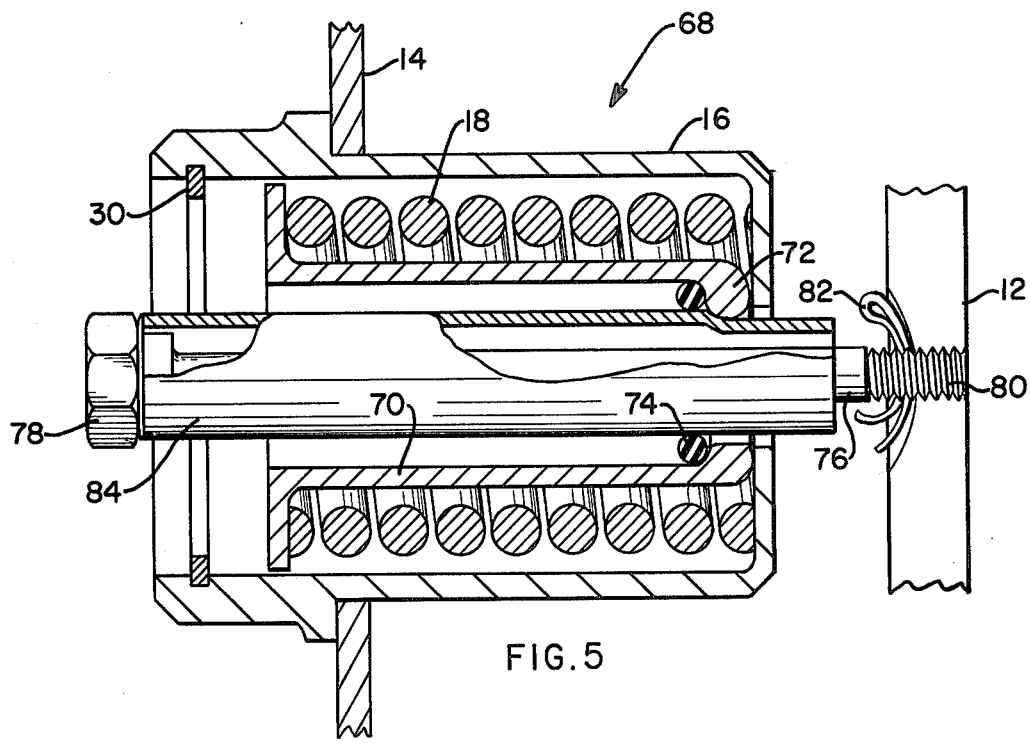
FIG. 5 is a sectional view of a second embodiment of the invention as the same would be used as original equipment in a brake assembly.

The embodiment of FIG. 1, as discussed above, is particularly adapted for implementation as a retrofit assembly. Should a brake adjuster assembly according to the teachings of the invention be incorporated in a brake system as original equipment, it would preferably be structured as the assembly 68 shown in FIG. 5. It will be noted again that the assembly 68 is operative between a pressure plate 12 and a brake housing 14, and includes certain elements identical to those of the embodiment of FIG. 1, evidenced by identical numerical designations. In this instance, however, the spring follower 70 includes at one end thereof a die 72, which is formed as part and parcel of the spring follower. An O-ring 74 is positioned about the reshapable tube 84 and before the die element 72 for wiping and sealing purposes, as was the O-ring 54.

Interconnection with the pressure plate 12 is achieved via a pin 76 having a head 78 at one end thereof and threads 80 at the other end, the threads 80 making engagement with the pressure plate 12 and secured thereto by a wire or cotter pin 82 in a woodruff key-type slot.

Maintained about the pin 76 is the reshapable tube 84, interconnected between the head 78 of the pin 76 and the die 72 of the spring follower 70. It should be readily apparent that the system 68 operates in substantially the same manner as the assembly 10 of FIG. 1. However, without the need for retrofitting, the assembly 68 is more simplistic in design and is easily constructed and interconnected between the pressure plate 12 and the housing 14. The number of parts is greatly reduced, as is the system cost.

As mentioned above, the embodiment of FIG. 5 is contemplated for use as original equipment in braking systems. It is also intended as comprising a portion of the instant invention that the casing 16 could be formed as part and parcel of the housing 14. Further, the pin 76 could be eliminated and the tube 84 could be tapped at one end thereof to thread onto a plug engaged with or formed in the pressure plate 12. The opposite end of the tube 84 could then be formed to receive a wrench or similar tool to facilitate engagement with the pressure plate 12. Such a brake adjuster might further include the tube 84 being necked down at the threaded end to pass through the die 72 during assembly.

It is believed to be well within the capabilities of one skilled in the art to select appropriate materials for constructing the elements of the various embodiments presented herein. However, it has been found that the dies 48,72 and the reshapable tubes 32,84 should be constructed of stainless steel to prevent rusting, corrosion, and the like. It is also preferred that the tube be of a Rockwell B75–80 hardness, while the die be of a Rockwell C35–40 hardness to achieve the desired results.

Thus it can be seen that the objects of the invention have been achieved by the structure presented hereinabove. While in accordance with the patent statues only the best mode and preferred embodiments of the invention have been presented and described in detail, it is to be understood that the invention is not limited thereto or thereby. Consequently, for an appreciation of the true scope and breadth of the invention, reference should be had to the following claims.

I claim:

1. In a braking system including a brake housing and a pressure plate, the improvement of a brake adjuster, comprising:
   a support member maintained in fixed relationship to the brake housing;
   reciprocating means operatively associated with said support member for reciprocating movement between first and second ends thereof;
   a die carried by said reciprocating means and movable therewithin; and
   a tubular member passing through said die and being operatively connected at one end thereof to the pressure plate and movable therewith, said die being in reshaping contacting engagement with said tubular member at a plurality of spaced-apart contact locations, a clearance being maintained between said die and tubular member between said contact locations.

2. The improvement of a brake adjuster in a braking system as recited in claim 1 wherein said contact locations are equally spaced about said die and tubular member.

3. The improvement of a brake adjuster in a braking system as recited in claim 1 wherein said tubular member passes through an opening in said die, said opening being defined by a rounded inner circumferential edge.

4. The improvement of a brake adjuster in a braking system as recited in claim 1 wherein said tubular member is cylindrical and wherein said die has a fluted opening receiving said tubular member.

5. The improvement of a brake adjuster in a braking system as recited in claim 1 wherein said tubular member is cylindrical and wherein said die has a polygonal opening receiving said tubular member.

6. The improvement of a brake adjuster in a braking system as recited in claim 1 wherein said tubular member has inner and outer surfaces, the perimeter of said outer surface being polygonal, and wherein said die has a circular opening receiving said polygonal surface.

7. The improvement of a brake adjuster in a braking system as recited in claim 6 wherein the perimeter of said inner surface of said tubular member is circular and wherein the vertices of said polygonal surface are rounded, forming arcuate surfaces.

8. The improvement of a brake adjuster in a braking system as recited in claim 1 which further includes sealing means maintained about said tubular member and in contacting engagement with said die for wiping said tubular member and preventing foreign matter from being interposed between said die and tubular member.

9. In a braking system including a pressure plate, a brake housing, a casing connected to the brake housing, a spring received within the casing, and a spring follower in contacting engagement with the spring and reciprocatingly movable within the casing, the improvement of a brake adjuster comprising:
   a die carried by the spring follower and movable therewith; and
   a tubular member passing axially through said die, and being interconnected at one end thereof to the pressure plate and movable therewith, said die being in reshaping contacting engagement with said tubular member, said die and tubular member contacting at a plurality of contact locations, a clearance being maintained between said die and tubular member between said contact locations, said die swaging said tubular member at said locations.

10. The improvement of a brake adjuster according to claim 9 wherein said die and tubular member are separated between said contact locations and which further includes a wiper encompassing said tubular member and in contacting engagement with said die.

11. The improvement of a brake adjuster according to claim 9 wherein said tubular member is cylindrical and said die has a fluted opening receiving said tubular member, said die having a rounded inner circumferential edge about said fluted opening.

12. The improvement of a brake adjuster according to claim 9 wherein said tubular member is cylindrical and wherein said die has a polygonal opening receiving said tubular member.

13. The improvement of a brake adjuster according to claim 9 wherein said tubular member has inner and outer surfaces, the perimeter of said outer surface being polygonal, and wherein said die has a circular opening, receiving said polygonal surface.

14. The improvement of a brake adjuster according to claim 13 wherein the perimeter of said inner surface of said tubular member is circular and wherein the vertices of said polygonal surface are rounded.

* * * * *